United States Patent
Habler et al.

(10) Patent No.: US 12,400,079 B1
(45) Date of Patent: Aug. 26, 2025

(54) MACHINE LEARNING MODEL DYNAMIC TOKEN SCREENING AND ENHANCED RESPONSE GENERATION

(71) Applicant: INTUIT INC., Mountain View, CA (US)

(72) Inventors: Idan Habler, Be'er Ya'akov (IL); Jonathan Rabin, Kfar Saba (IL); Guy Shtar, Ness Ziona (IL); Tsofit Efroni Zazon, Kadima Tzoran (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/191,489

(22) Filed: Apr. 28, 2025

(51) Int. Cl.
   *G06F 40/30* (2020.01)
   *G06F 40/284* (2020.01)

(52) U.S. Cl.
   CPC .................... *G06F 40/284* (2020.01)

(58) Field of Classification Search
   CPC .... G06F 40/211; G06F 40/253; G06F 40/268; G06F 40/284; G06F 40/30; G06N 3/08; G10L 15/00
   See application file for complete search history.

(56) References Cited

U.S. PATENT DOCUMENTS

| | | | | |
|---|---|---|---|---|
| 12,210,770 | B1 * | 1/2025 | Patki | G06F 3/0604 |
| 2018/0285599 | A1 * | 10/2018 | Praveen | G06F 18/22 |
| 2022/0199073 | A1 * | 6/2022 | Ramadas | G10L 15/22 |
| 2022/0199093 | A1 * | 6/2022 | Ramadas | G06F 21/6254 |
| 2023/0077317 | A1 * | 3/2023 | Iyer | G06T 11/00 |
| 2023/0096474 | A1 * | 3/2023 | Krishnan | G06N 3/0464 |
| | | | | 726/26 |
| 2023/0269291 | A1 * | 8/2023 | Ramadas | G10L 15/30 |
| | | | | 709/201 |
| 2023/0376614 | A1 * | 11/2023 | Wu | G06N 3/0455 |
| 2023/0409969 | A1 * | 12/2023 | Panda | G06N 20/00 |
| 2024/0119003 | A1 * | 4/2024 | Tobkin | G06F 12/0842 |
| 2025/0005189 | A1 * | 1/2025 | Mondal | G06Q 10/06 |
| 2025/0028847 | A1 * | 1/2025 | Chen | G06N 20/00 |

(Continued)

OTHER PUBLICATIONS

Lin Zehui et al., "DropAttention: A Regularization Method for Fully-Connected Self-Attention Networks", arXiv: 1907.11065v2 [cs. CL] Jul. 26, 2019.

*Primary Examiner* — Lamont M Spooner
(74) *Attorney, Agent, or Firm* — Patterson + Sheridan, LLP

(57) ABSTRACT

Aspects of the present disclosure relate to dynamic token screening and enhanced response generation using machine learning models. Embodiments include determining, by a machine learning model, a baseline attention weight for each token of a plurality of tokens contained in a text string received as an input to the machine learning model. Embodiments include identifying one or more protected tokens of the plurality of tokens contained in the text string and generating a dropout probability for each protected token of the one or more protected tokens. Embodiments include determining, by the machine learning model, a revised attention weight for each token of the plurality of tokens based on the dropout probability for each protected token. Embodiments include generating, by the machine learning model, an output based on the text string and the revised attention weight for each token. Embodiments include providing the output in response to the input.

20 Claims, 5 Drawing Sheets

(56) References Cited

U.S. PATENT DOCUMENTS

| | | | |
|---|---|---|---|
| 2025/0068764 A1* | 2/2025 | Joshi | G06F 40/20 |
| 2025/0123329 A1* | 4/2025 | Patki | G01R 31/31727 |
| 2025/0165444 A1* | 5/2025 | Rahimov | G06F 16/215 |
| 2025/0181766 A1* | 6/2025 | Marathe | G06F 40/295 |

* cited by examiner

MACHINE LEARNING MODEL DYNAMIC TOKEN SCREENING AND ENHANCED RESPONSE GENERATION

INTRODUCTION

Aspects of the present disclosure relate to techniques for dynamic token screening and enhanced response generation using machine learning models. In particular, techniques described herein involve identifying protected tokens in a text string provided to a machine learning model, revising baseline attention weights associated with each token in the text string based on dropout probabilities calculated for each protected token, and generating a response based on the revised attention weights and the text string.

BACKGROUND

Every year, millions of people, businesses, and organizations around the world use software applications to assist with countless aspects of life. Because of this, both the amount of software applications and the complexity of software applications have greatly increased. With both business and personal transactions occurring on a global scale, even small and/or temporary issues can result in significant ramifications. Providing timely and accurate technical support is therefore crucial to keeping software applications running smoothly. Additionally, these software applications often have access to and/or are provided with personal information of the individuals using the software applications (e.g., for processing, transferring, storing, and/or the like). As a result, software applications are increasingly the target of fraudulent activity. When that fraud is successful, sensitive data, including financial, personal, and otherwise, may be compromised or at risk. Such a breach may have lasting, personal impacts on individuals, and global ramifications for a company. Consequently, robust technical support is needed for these software applications that both ensures security and provides accurate responses to user queries.

Existing techniques do not adequately address the aforementioned security concerns when providing technical support, which leads to compromised data as well as increased costs associated with the time and resources required to implement other measures and/or take remedial actions.

Thus, there is a need in the art for improved techniques for providing secure and accurate technical support in software applications.

BRIEF SUMMARY

Certain embodiments provide a method of dynamic token screening and enhanced response generation using machine learning models. The method generally includes: receiving an input comprising a text string for processing by a machine learning model; determining, by the machine learning model, a baseline attention weight for each token of a plurality of tokens contained in the text string; identifying one or more protected tokens of the plurality of tokens contained in the text string; generating a dropout probability for each protected token of the one or more protected tokens; determining, by the machine learning model, a revised attention weight for each token of the plurality of tokens contained in the text string based on the dropout probability for each protected token of the one or more protected tokens; generating, by the machine learning model, an output based on the text string and the revised attention weight for each token of the plurality of tokens contained in the text string; and providing the output in response to the input.

Other embodiments provide processing systems configured to perform the aforementioned method as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
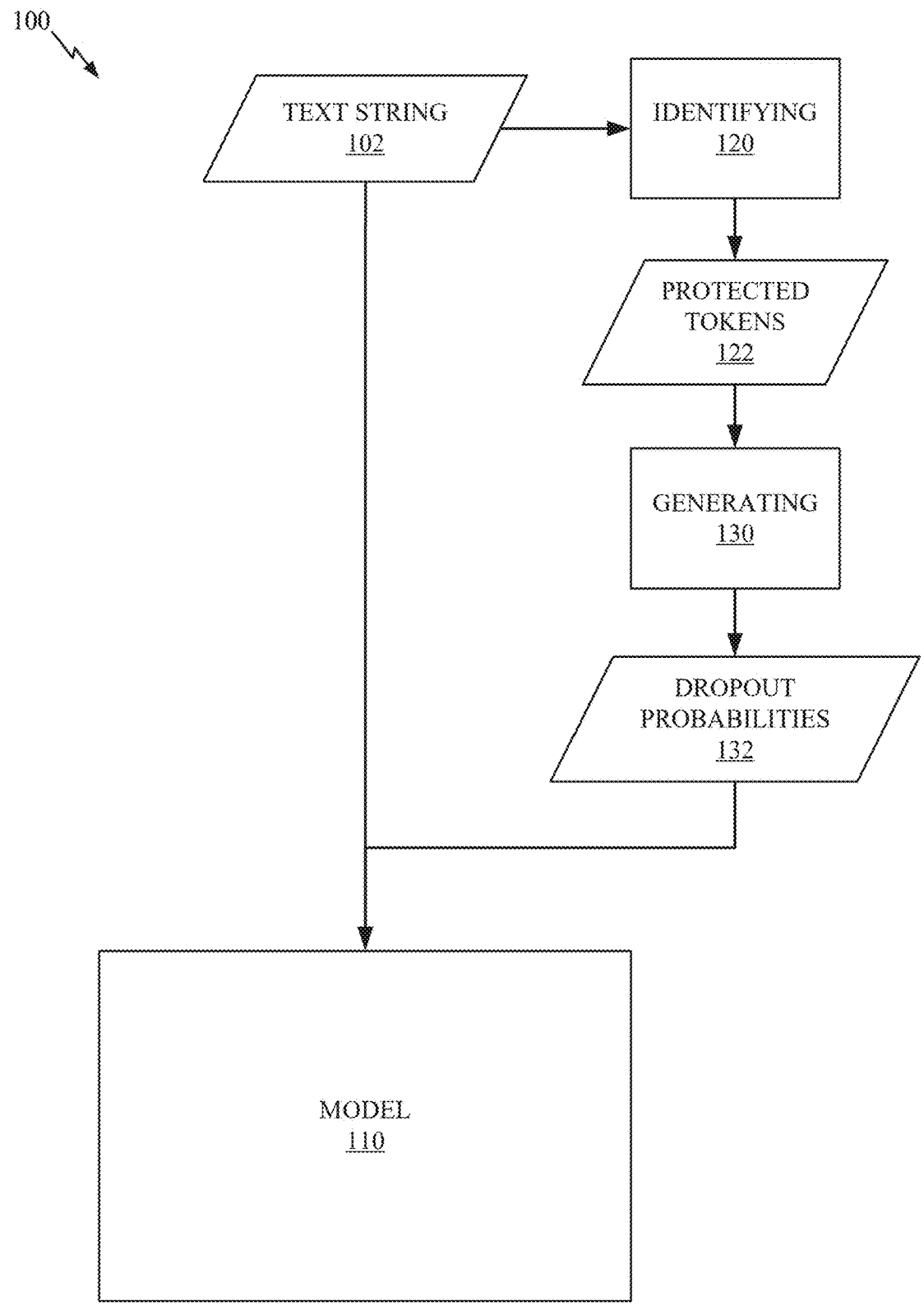
FIG. 1 depicts an example of workflow related to dynamic token screening and enhanced response generation using machine learning models.

Aspects of the present disclosure provide apparatuses, methods, processing systems, and computer-readable mediums for dynamic token screening and enhanced response generation using machine learning models.

Providing accurate and secure technical support is crucial to keeping software applications running smoothly while also protecting sensitive information. Current techniques for providing technical support fail to adequately address both of these interests, resulting in wasted time and resources required to mitigate compromised information and/or correct erroneous results. To improve technical support in software applications, techniques described herein employ machine learning models to automatically identify sensitive information in a text string, adjust attention weights associated with tokens in the text string, and generate a response to an input accordingly. Such techniques result in an automated process that is more accurate and more secure than alternative techniques, which enhances data privacy and improves response precision.

For example, an input may be provided to a machine learning model, such as a language processing machine learning model. The language processing machine learning model may, for instance, be a large language model capable of processing natural language inputs and generating natural language outputs. The input may be a text string, such as a natural language message sent by a user (e.g., via electronic mail, instant message, a chat bot, and/or the like) seeking support for a particular software application (or an aspect thereof). The machine learning model may determine a baseline attention weight for each token contained in the text string. For example, a token may correspond to each word of the text string. The baseline attention weight may refer to how much weight the machine learning model is to assign each token when processing the text string in order to generate a response. Determining the baseline attention weights for each token may be based on a constant multiplier value associated with each token as well as based on comparing each token to the rest of the tokens in the text string. For example, an article, such as "the" may receive a lower baseline attention weight than more substantive words, such as "account" and "settings." Generally, the baseline attention weights will consist of a decimal value between zero and one such that the sum of all the baseline attention weights will equal one.

Next, one or more protected tokens may be identified in the text string. For example, a classifier may be trained to identify tokens matching patterns indicative of sensitive information (e.g., a sequence resembling a social security number or a sequence attempting to elicit a social security number). In this way, sensitive information provided to the machine learning model may be identified along with malicious inputs seeking to obtain an individual's information from the model. A dropout probability may then be generated for each protected token identified in the text string. For example, a high dropout probability (e.g., 0.9) may be assigned to a protected token (i.e., tokens identified as containing sensitive information). The remaining tokens may receive no dropout probability, or a low dropout probability (e.g., 0.1).

Based on the dropout probabilities, the machine learning model may determine a revised attention weight for each token in the text string. For example, the baseline attention weight for a particular token may be multiplied by a value calculated based on the dropout probability for that particular token. Generally, the revised attention weight for a protected token will be smaller than the baseline attention weight for that protected token. In this way, the machine learning model will know to afford less significance to and/or ignore that token when generating a response to the text string. The revised attention weights for tokens not identified as protected tokens (i.e., that have no or small dropout probabilities), may be based on re-normalizing the baseline attention weights for those tokens such that all revised attention weights still sum to one.

Lastly, the machine learning model may generate an output based on the text string and the revised attention weights. For example, the output may be a natural language response to the user's message seeking technical support that provides a solution, requests more details, and/or the like. The machine learning model may exclude from the output tokens with high dropout probability (e.g., exceeding a threshold value), thereby protecting the sensitive information from being processed and/or displayed. The output may then be provided, and further action may be performed, such as displaying the output via a user interface or sending the output to one or more elements of a software application.

Embodiments of the present disclosure provide numerous technical and practical effects and benefits. As noted above, providing secure and accurate technical support is imperative to maintaining operational software applications while also ensuring robust data privacy. Existing techniques for automated technical support do not adequately address security concerns, which leads to compromised data, increased costs, and a diminished user experience. The present disclosure solves these technical problems. Techniques described herein ensure accurate and secure automated technical support by automatically identifying protected tokens in text provided to a machine learning model, adjusting attention weights associated with the tokens, and generating an output based on the revised attention weights. Adjusting attention weights for protected tokens (e.g., those conveying sensitive information) ensures that the machine learning model only processes and/or outputs non-sensitive information (e.g., since it will disregard the protected tokens), while re-normalizing the attention weights of the remaining tokens ensures that accuracy is maintained as the relative distribution of the weights is preserved (i.e., the most important words in the text string are still prioritized by the machine learning model). The automated process conserves resources during processing (e.g., compared to manual methods for protecting sensitive data) as well as in avoiding having to take remedial steps when sensitive data is compromised. Additionally, these techniques keep sensitive data secure and provide accurate responses to user queries, which improves the efficiency of the software application and provides the user a better overall experience.

Example Workflows Related to Dynamic Token Screening and Enhanced Response Generation Using Machine Learning Models FIG. 1 depicts an example workflow 100 related to dynamic token screening and enhanced response generation using machine learning models. For example, workflow 100 may represent a series of steps associated with processing a text string to identify features and determine values associated with the text string.

A text string 102, such as a natural language communication, may be provided to the system via a user interface. For example, the text string 102 may comprise a message sent by a user via e-mail, instant message, a chat box, social media, and/or a channel or sub-channel of a communication app, among others. In some embodiments, the user may, through the text string 102, request technical assistance with one more aspects of a software application. The text string 102 may contain a plurality of tokens. For example, each token may represent a word of the text string 102. Together, the plurality of tokens represents all words contained in the text string 102. Additionally, the text string 102 may include sensitive information, such as a password, credit card number, social security number, etc., and/or include a request for sensitive information (e.g., asking for an individual's current password).

During identifying 120, one or more protected tokens 122 of the plurality of tokens contained in the text string 102 are identified. The identifying 120 may comprise scanning the text string 102 for tokens containing certain risk attributes (e.g., indicative of sensitive information). For example, a number matching the format (e.g., number of digits, placement of a dash, etc.) of a social security number may be identified as sensitive. A combination of words such as "social," "security," "number," "ssn," "SSN," and/or the like may also be flagged. In some embodiments, the identifying 120 may be performed by a classifier model (e.g., a support vector machine, decision tree, and/or the like) trained to detect patterns associated with sensitive information. In other embodiments, the identifying 120 may be performed using regular expressions, predefined dictionaries, similarities metrics (e.g., FAISS), and/or anomaly detection algorithms (e.g., isolation forest, local outlier factor, etc.), among others.

For each protected token of protected tokens 122, a dropout probability may then be generated during generating 130. Dropout probabilities 132 may be generated based on the riskiness of a particular token. For example, a protected token identified (e.g., during identifying 120) as containing (or eliciting) sensitive information, such as a social security number, may be assigned a high dropout probability (e.g., 0.9). On the other hand, tokens not identified as protected may not be assigned a dropout probability or may be assigned a low dropout probability (e.g., 0.1). The dropout probabilities 132, along with the text string 102, may then be provided to a model 110 for further processing as described below with respect to FIG. 2.

In some aspects, identifying 120 and generating 130 are performed by one or more software components associated with model 110, such as an agent component associated with model 110. In other aspects, identifying 120 and/or generating 130 may be performed by model 110 itself.

Figure 2:
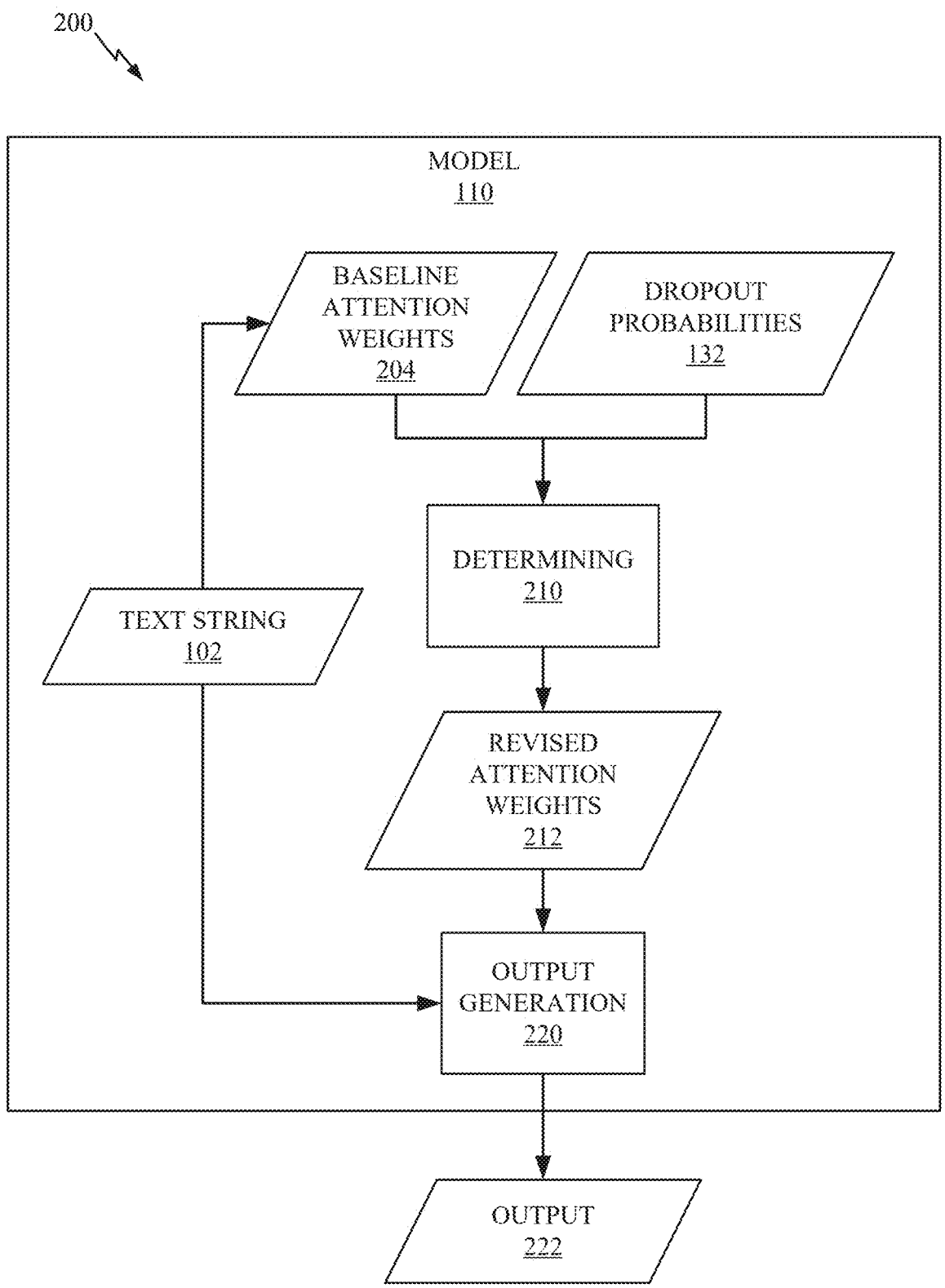
FIG. 2 depicts an additional example of workflow related to dynamic token screening and enhanced response generation using machine learning models.

FIG. 2 depicts an additional example workflow 200 related to dynamic token screening and enhanced response generation using machine learning models. In particular, FIG. 2 depicts a series of steps that may be performed subsequent to the processing of FIG. 1 in which a response to the text string is generated based on the values associated with the text string.

The model 110 may comprise a machine learning model. In a particular example, model 110 is a language processing machine learning model such as a large language model (LLM). For example, model 110 may have been trained on a large training data set in order to process natural language inputs and generate natural language content in response. In some embodiments, model 110 is a generative pre-trained transformer (GPT) model that has been trained on a large set of training data (e.g., across a plurality of domains), and is capable as a result of such training to perform a wide variety of language-related tasks in response to natural language prompts. In some embodiments, model 110 has been fine-tuned for one or more particular domains, such as for use with a particular software application or for a specific purpose, while in other embodiments model 110 has been trained in a more general fashion and has not been fine-tuned in such a manner. Model 110 may have a large number of tunable parameters, which are iteratively adjusted during a model training process based on training data. In alternative embodiments, model 110 may be another type of machine learning model that is capable of generating content. For example, model 110 may be a generative adversarial network (GAN), an autoencoder model, an autoregressive model, a diffusion model, a Bayesian network, a hidden Markov model, and/or the like.

As noted above with respect to FIG. 1, the model 110 may receive the text string 102 and the dropout probabilities 132. Based on the text string 102, baseline attention weights 204 may be determined for each token of the plurality of tokens contained in the text string 102. Attention weights may generally refer to the weight, or importance, that a machine learning model, such as model 110, may apply to each token of a text string when generating a response. For example, the machine learning model may focus on processing words with large attention weights and disregard words with very low attention weights. Attention weights are typically decimal values between zero and one that, when summed for a given text string, equal one. The baseline attention weights 204 may be based on a constant multiplier value associated with each token of the plurality of tokens and on comparing each token of the plurality of tokens contained in the text string to all other tokens of the plurality of tokens contained in the text string. For example, a particular word, such as "help," may always be assigned a certain fixed value, while another word, such as "access," may be assigned a different fixed value when present in a particular text string. Additionally, the tokens may be compared to each other to determine a relative importance of each token. For example, an article like "the" may be afforded much less weight in a text string compared to "access" since "access" may describe the substance of the sentence while "the" is merely an article that provides no further information or context. This comparing may be performed, for instance, using cosine similarity.

Using the baseline attention weights 204 and the dropout probabilities 132 (e.g., generated during generating 130 as depicted in FIG. 1), revised attention weights 212 may then be determined, during determining 210, for each token of the plurality of tokens contained in the text string. Each revised attention weight of revised attention weights 212 may be determined by adjusting the baseline attention weight for a particular token based on the dropout probability for that particular token. In some embodiments, the formula, revised attention weight baseline attention weight×(1−dropout probability), may be used to calculate the revised attention weight for each token. As a result, the protected tokens (e.g., with high dropout probabilities) will have a smaller revised attention weight than its baseline attention weight, which reduces and/or eliminates the influence of those protected tokens when the model 110 generates an output, as described below. The revised attention weights for the remaining tokens (i.e., tokens not identified as protected), which will be similar to or the same as their respective baseline attention weights since their dropout probability is zero or near zero, may then be re-normalized so that all the revised attention weights (for both the protected tokens and the non-protected tokens) add up to one. This maintains the integrity of the attention weight distribution across the tokens. In other words, the revised attention weights for the protected entities may be calculated solely using the formula while the revised attention weights for the other tokens will first be calculated using the formula and then normalized in light of the much smaller revised attention weights for the protected tokens. Thus, techniques described herein overcome a technical challenge of ensuring data privacy within a machine learning model through the technical solution of dynamically configuring the model through automatically adjusted attention weights to focus the model's attention on non-protected tokens and causing the model to disregard protected tokens while preserving the relative proportions of the attention weights of non-protected tokens.

Once the revised attention weights 212 are determined for all of the tokens, the model 110 may generate an output 222 based on the revised attention weights 212 and the text string 102 during output generation 220. When processing the text string 102, the model 110 may place little to no emphasis on the tokens with small revised attention weights (e.g., the protected tokens and/or filler words) while placing more emphasis on tokens with larger revised attention weights (e.g., important, substantive words). This ensures that the model 110 generates an output that accurately responds to the subject matter of the input, but that also excludes any sensitive information. In some embodiments, one or more protected tokens may be excluded from the output 222 if their associated dropout probability exceeds a threshold value. Incidentally, the efficiency of the system is increased as the model 110 need only process the most pertinent and least risky tokens when generating a response. Once the output 222 is generated, it may provided by the model in response to the input. One or more further actions may be performed, such as displaying the output 222 via a user interface (e.g., user interface 310 of FIG. 3) and/or sending the output 222 to one or more elements of a software application.

Figure 3:
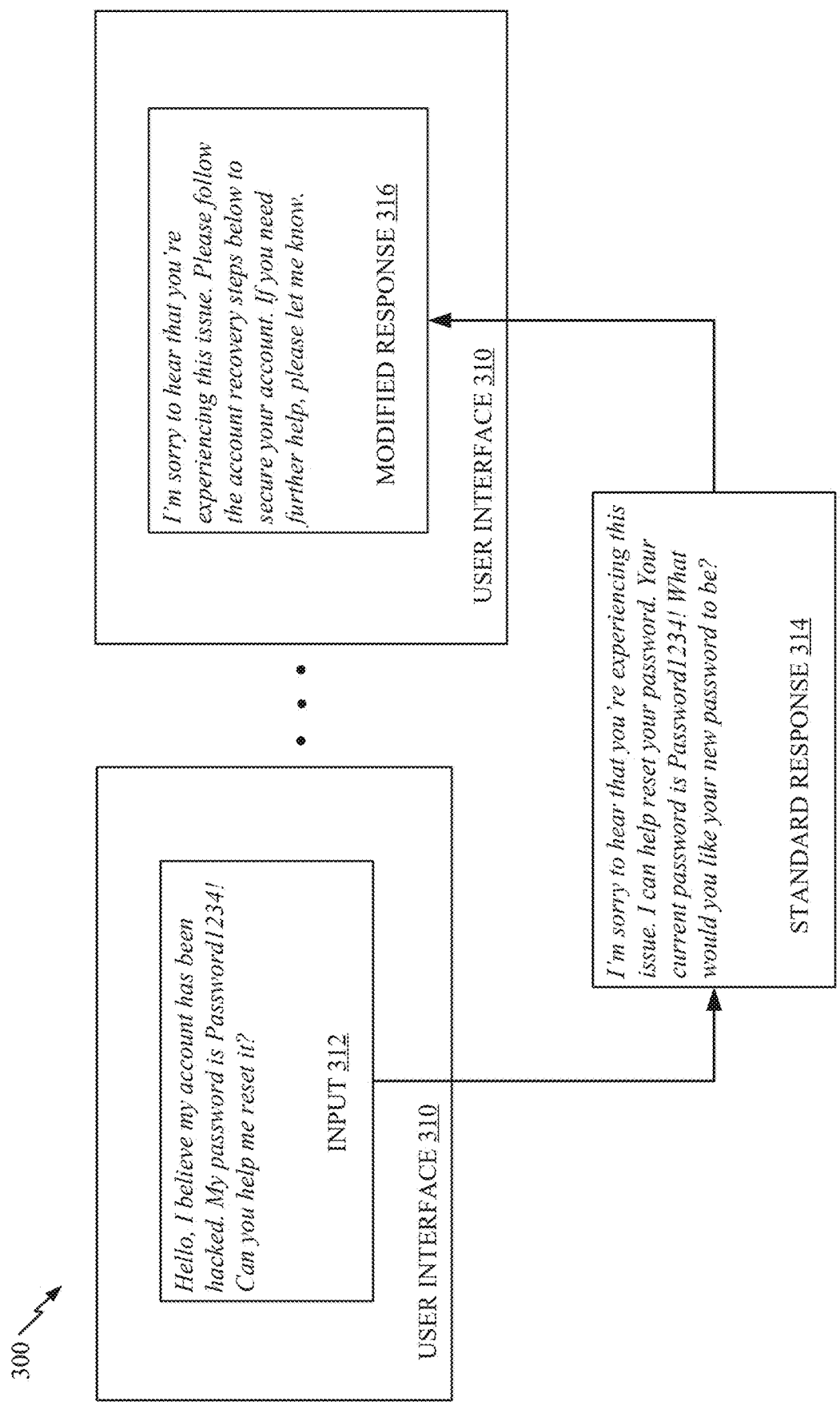
FIG. 3 is a block diagram illustrating an example related to dynamic token screening and enhanced response generation using machine learning models.

Example Block Diagram Related to Dynamic Token Screening and Enhanced Response Generation Using Machine Learning Models FIG. 3 depicts a block diagram 300 illustrating an example related to dynamic token screening and enhanced response generation using machine learning models. For example, block diagram 300 may represent a user input and a modified response generated by one or more steps described with respect to FIG. 1 and/or FIG. 2 and displayed on a user interface 310 (e.g., associated with a computing application running on a computing device).

An input 312 may be provided to a software application via a user interface 310. For example, the input 312 may be a natural language message provided by a user (e.g., via electronic mail, instant message, a chat bot, and/or the like) seeking technical support for one or more aspects of the software application or another software application. The input 312 may include sensitive information, such as a password, credit card number, social security number, and/or the like. As described with respect to FIG. 1 and FIG. 2, the input 312 may undergo processing where any protected tokens in the input 312 are identified, corresponding attention weights are revised, and an output is generated without revealing sensitive information associated with the protected tokens. The system may then provide a modified response 316 (e.g., addressing the subject matter of the input 312), such as via the user interface 310.

Notably, the modified document 316 does not contain any sensitive information even though the user provided sensitive information (e.g., in the input 312) and asked a question that may elicit a response containing sensitive information. As depicted in standard response 314, when the process enumerated herein is not utilized, the machine learning model may output a response that contains sensitive information (such as a password) and/or may ask the user to provide sensitive information. By first identifying protected tokens within input 312 and then adjusting corresponding attention weights, the system is able to accurately assist the user (e.g., the modified response still provides help for resetting the password) but without putting any sensitive information at risk (e.g., revealing the old and/or new password). This protects not only data that the user may reveal but also prevents a bad actor from gaining access to sensitive information about an individual by asking a question that seeks to elicit that sensitive information.

Figure 4:
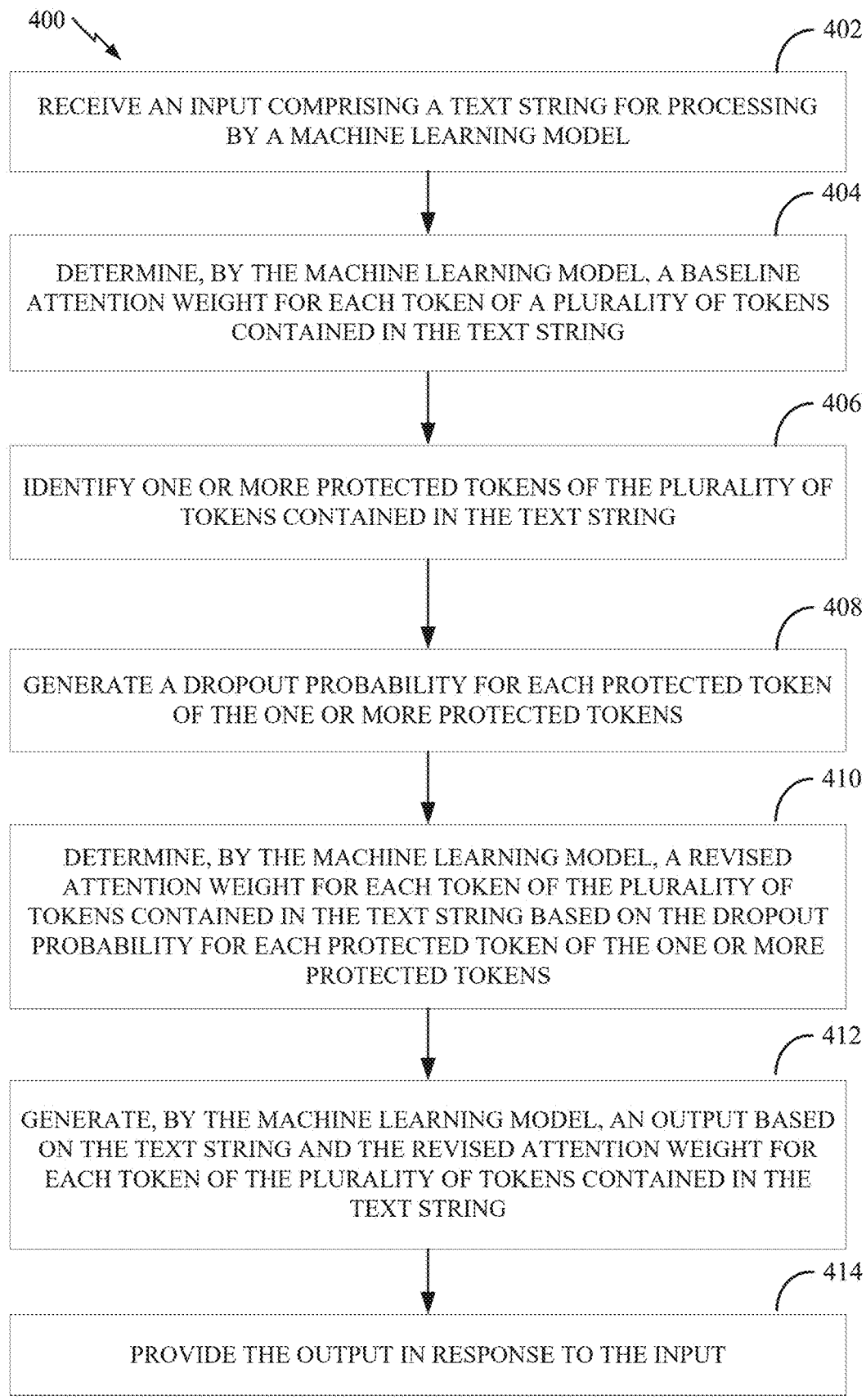
FIG. 4 depicts example operations related to dynamic token screening and enhanced response generation using machine learning models.

Example Operations Related to Dynamic Token Screening and Enhanced Response Generation Using Machine Learning Models FIG. 4 depicts example operations 400 related to dynamic token screening and enhanced response generation using machine learning models. For example, operations 400 may be performed by one or more of the components described with respect to FIG. 1, FIG. 2, and/or FIG. 3.

Operations 400 begin at step 402 with receiving an input comprising a text string for processing by a machine learning model.

Operations 400 continue at step 404 with determining, by the machine learning model, a baseline attention weight for each token of a plurality of tokens contained in the text string. In some embodiments, the determining, by the machine learning model, the baseline attention weight for each token of a plurality of tokens contained in the text string is based on a constant multiplier value associated with each token of the plurality of tokens contained in the text string and on comparing each token of the plurality of tokens contained in the text string to all other tokens of the plurality of tokens contained in the text string.

Operations 400 continue at step 406 with identifying one or more protected tokens of the plurality of tokens contained in the text string. According to certain embodiments, the identifying the one or more protected tokens of the plurality of tokens contained in the text string comprises scanning the text string for tokens containing one or more risk attributes.

Operations 400 continue at step 408 with generating a dropout probability for each protected token of the one or more protected tokens.

Operations 400 continue at step 410 with determining, by the machine learning model, a revised attention weight for each token of the plurality of tokens contained in the text string based on the dropout probability for each protected token of the one or more protected tokens. Some embodiments provide that a revised attention weight corresponding to a particular protected token of the one or more protected tokens is smaller in value than a baseline attention weight corresponding to the particular protected token of the one or more protected tokens.

Operations 400 continue at step 412 with generating, by the machine learning model, an output based on the text string and the revised attention weight for each token of the plurality of tokens contained in the text string. In certain embodiments, the generating, by the machine learning model, the output based on the text string and the revised attention weight for each token of the plurality of tokens contained in the text string comprises excluding, from the output, the one or more protected tokens of the plurality of tokens contained in the text string. According to some embodiments, the excluding, from the output, the one or more protected tokens of the plurality of tokens contained in the text string is based on comparing the dropout probability for each protected token of the one or more protected tokens to a threshold value.

Operations 400 continue at step 414 with providing the output in response to the input.

Certain embodiments provide that the method further comprises performing an action based on the output, wherein the performing of the action based on the output comprises one or more of: displaying the output via a user interface or sending the output to one or more elements of a software application.

Figure 5:
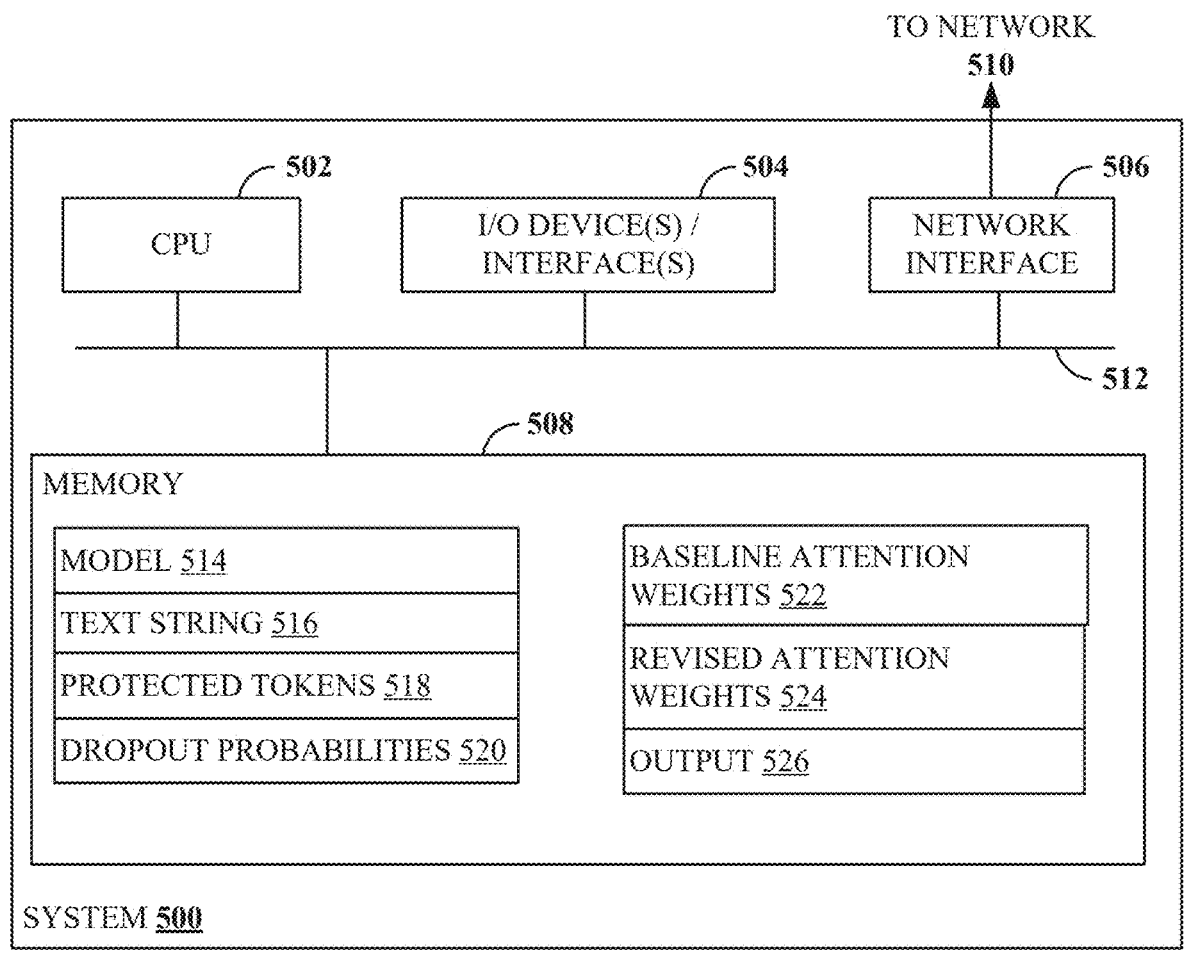
FIG. 5 depicts an example of a processing system for dynamic token screening and enhanced response generation using machine learning models.

Example of a Processing System for Dynamic Token Screening and Enhanced Response Generation Using Machine Learning Models FIG. 5 illustrates an example system 500 with which embodiments of the present disclosure may be implemented. For example, system 500 may be configured to perform operations 400 of FIG. 4 and/or to implement one or more components as in FIG. 1, FIG. 2, or FIG. 3.

System 500 includes a central processing unit (CPU) 502, one or more I/O device interfaces that may allow for the connection of various I/O devices 504 (e.g., keyboards, displays, mouse devices, pen input, etc.) to the system 500, network interface 506, a memory 508, and an interconnect 512. It is contemplated that one or more components of system 500 may be located remotely and accessed via a network 510. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes model 514, text string 516, protected tokens 518, and dropout probabilities 520. Model 514 may be representative of model 110 of FIG. 1 and FIG. 2. Text string 516 may be representative of text string 102 of FIG. 1 and FIG. 2. Protected tokens 518 may be representative of protected tokens 122 of FIG. 1. Dropout probabilities 520 may be representative of dropout probabilities 132 of FIG. 1 and FIG. 2.

Memory 508 further comprises baseline attention weights 522 which may correspond to baseline attention weights 204 of FIG. 2. Memory 508 further comprises revised attention weights 524 which may correspond to revised attention weights 212 of FIG. 2. Memory 508 further comprises output 526, which may correspond to output 222 of FIG. 2. It is noted that in some embodiments, system 500 may interact with one or more external components, such as via network 510, in order to retrieve data and/or perform operations. Furthermore, techniques described herein may be implemented via more or fewer components than those shown and described with respect to FIG. 5, such as on one or more computing systems.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a c c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for dynamic token screening and enhanced response generation using machine learning models, comprising:
   receiving an input comprising a text string for processing by a machine learning model;
   determining, by the machine learning model, a baseline attention weight for each token of a plurality of tokens contained in the text string;
   identifying one or more protected tokens of the plurality of tokens contained in the text string;
   generating a dropout probability for each protected token of the one or more protected tokens;
   determining, by the machine learning model, a revised attention weight for each token of the plurality of tokens contained in the text string based on the dropout probability for each protected token of the one or more protected tokens;
   generating, by the machine learning model, an output based on the text string and the revised attention weight for each token of the plurality of tokens contained in the text string; and
   providing the output in response to the input.

2. The method of claim 1, wherein the determining, by the machine learning model, the baseline attention weight for each token of a plurality of tokens contained in the text string is based on a constant multiplier value associated with each token of the plurality of tokens contained in the text string and on comparing each token of the plurality of tokens contained in the text string to all other tokens of the plurality of tokens contained in the text string.

3. The method of claim 1, wherein the identifying the one or more protected tokens of the plurality of tokens contained in the text string comprises scanning the text string for tokens containing one or more risk attributes.

4. The method of claim 1, wherein a revised attention weight corresponding to a particular protected token of the one or more protected tokens is smaller in value than a baseline attention weight corresponding to the particular protected token of the one or more protected tokens.

5. The method of claim 1, wherein the generating, by the machine learning model, the output based on the text string and the revised attention weight for each token of the plurality of tokens contained in the text string comprises excluding, from the output, the one or more protected tokens of the plurality of tokens contained in the text string.

6. The method of claim 5, wherein the excluding, from the output, the one or more protected tokens of the plurality of tokens contained in the text string is based on comparing the dropout probability for each protected token of the one or more protected tokens to a threshold value.

7. The method of claim 1, further comprising performing an action based on the output, wherein the performing of the action based on the output comprises one or more of:
 displaying the output via a user interface; or
 sending the output to one or more elements of a software application.

8. A system for dynamic token screening and enhanced response generation using machine learning models, comprising:
 one or more processors; and
 a memory comprising instructions that, when executed by the one or more processors, cause the system to:
  receive an input comprising a text string for processing by a machine learning model;
  determine, by the machine learning model, a baseline attention weight for each token of a plurality of tokens contained in the text string;
  identify one or more protected tokens of the plurality of tokens contained in the text string;
  generate a dropout probability for each protected token of the one or more protected tokens;
  determine, by the machine learning model, a revised attention weight for each token of the plurality of tokens contained in the text string based on the dropout probability for each protected token of the one or more protected tokens;
  generate, by the machine learning model, an output based on the text string and the revised attention weight for each token of the plurality of tokens contained in the text string; and
  provide the output in response to the input.

9. The system of claim 8, wherein the determining, by the machine learning model, the baseline attention weight for each token of a plurality of tokens contained in the text string is based on a constant multiplier value associated with each token of the plurality of tokens contained in the text string and on comparing each token of the plurality of tokens contained in the text string to all other tokens of the plurality of tokens contained in the text string.

10. The system of claim 8, wherein the identifying the one or more protected tokens of the plurality of tokens contained in the text string comprises scanning the text string for tokens containing one or more risk attributes.

11. The system of claim 8, wherein a revised attention weight corresponding to a particular protected token of the one or more protected tokens is smaller in value than a baseline attention weight corresponding to the particular protected token of the one or more protected tokens.

12. The system of claim 8, wherein the generating, by the machine learning model, the output based on the text string and the revised attention weight for each token of the plurality of tokens contained in the text string comprises excluding, from the output, the one or more protected tokens of the plurality of tokens contained in the text string.

13. The system of claim 12, wherein the excluding, from the output, the one or more protected tokens of the plurality of tokens contained in the text string is based on comparing the dropout probability for each protected token of the one or more protected tokens to a threshold value.

14. The system of claim 8, wherein the instructions, when executed by the one or more processors, further cause the system to perform an action based on the output, wherein the performing of the action based on the output comprises one or more of:
 displaying the output via a user interface; or
 sending the output to one or more elements of a software application.

15. A non-transitory computer readable medium comprising instructions that, when executed by one or more processors of a computing system, cause the computing system to:
 receive an input comprising a text string for processing by a machine learning model;
 determine, by the machine learning model, a baseline attention weight for each token of a plurality of tokens contained in the text string;
 identify one or more protected tokens of the plurality of tokens contained in the text string;
 generate a dropout probability for each protected token of the one or more protected tokens;
 determine, by the machine learning model, a revised attention weight for each token of the plurality of tokens contained in the text string based on the dropout probability for each protected token of the one or more protected tokens;
 generate, by the machine learning model, an output based on the text string and the revised attention weight for each token of the plurality of tokens contained in the text string; and
 provide the output in response to the input.

16. The non-transitory computer readable medium of claim 15, wherein the determining, by the machine learning model, the baseline attention weight for each token of a plurality of tokens contained in the text string is based on a constant multiplier value associated with each token of the plurality of tokens contained in the text string and on comparing each token of the plurality of tokens contained in the text string to all other tokens of the plurality of tokens contained in the text string.

17. The non-transitory computer readable medium of claim 15, wherein the identifying the one or more protected tokens of the plurality of tokens contained in the text string comprises scanning the text string for tokens containing one or more risk attributes.

18. The non-transitory computer readable medium of claim 15, wherein a revised attention weight corresponding to a particular protected token of the one or more protected tokens is smaller in value than a baseline attention weight corresponding to the particular protected token of the one or more protected tokens.

19. The non-transitory computer readable medium of claim 15, wherein the generating, by the machine learning model, the output based on the text string and the revised attention weight for each token of the plurality of tokens contained in the text string comprises excluding, from the output, the one or more protected tokens of the plurality of tokens contained in the text string.

20. The non-transitory computer readable medium of claim 19, wherein the excluding, from the output, the one or more protected tokens of the plurality of tokens contained in the text string is based on comparing the dropout probability for each protected token of the one or more protected tokens to a threshold value.

* * * * *